(12) United States Patent  (10) Patent No.: US 8,809,723 B2
Fessl et al.  (45) Date of Patent: Aug. 19, 2014

(54) INSERTION ELEMENT, GAS LENS WITH SUCH AN INSERTION ELEMENT, AND WELDING TORCH WITH SUCH A GAS LENS

(75) Inventors: Jochen Fessl, Scharnstein (AT); Melanie Gebesmair, Nussbach (AT); Josef Leeb, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 606 days.

(21) Appl. No.: 12/311,480

(22) PCT Filed: Aug. 22, 2007

(86) PCT No.: PCT/AT2007/000400
§ 371 (c)(1),
(2), (4) Date: Mar. 31, 2009

(87) PCT Pub. No.: WO2008/043114
PCT Pub. Date: Apr. 17, 2008

(65) Prior Publication Data
US 2009/0277878 A1 Nov. 12, 2009

(30) Foreign Application Priority Data
Oct. 12, 2006 (AT) .................. A 1702/2006

(51) Int. Cl.
*B23K 9/29* (2006.01)
*B23K 9/167* (2006.01)
*B23K 9/24* (2006.01)
*B23K 9/28* (2006.01)

(52) U.S. Cl.
CPC . *B23K 9/167* (2013.01); *B23K 9/29* (2013.01); *B23K 9/296* (2013.01); *B23K 9/24* (2013.01); *B23K 9/291* (2013.01); *B23K 9/285* (2013.01)
USPC ....... 219/74; 219/122; 219/61.6; 219/121.48; 219/121.51; 219/121.52; 219/121.55; 219/75

(58) Field of Classification Search
CPC ............ B23K 9/29; B23K 9/24; B23K 9/291; B23K 9/167; B23K 9/285; B23K 9/296; H05H 1/34
USPC ................ 219/74, 122, 61.6, 121.48, 121.51, 219/121.52, 121.55, 75; 217/75
See application file for complete search history.

(56) References Cited

U.S. PATENT DOCUMENTS 2,866,079 A * 12/1958 Morley, Jr. et al. ...... 219/137.44
3,180,967 A 4/1965 Hill
(Continued)

FOREIGN PATENT DOCUMENTS

EP 0 094 984 11/1983
EP 94984 A1 * 11/1983 ............. B23K 28/00
(Continued)

OTHER PUBLICATIONS

International Search Report.

*Primary Examiner* — Henry Yuen
*Assistant Examiner* — Diallo I Duniver
(74) *Attorney, Agent, or Firm* — Collard & Roe, P.C.

(57) ABSTRACT

For a WIG/TIG welding torch, gas distribution across a cross-section of the gas lens and/or the gas nozzle, is improved and as small a size and as low a weight of the components as possible can be achieved, when an insertion element with a bore in the center through which an electrode is to be guided is arranged, with fan-shaped flow elements being positioned around the bore and twisted relative to the plane of the bore so as to provide for radial deviation of a gas flowing therethrough. The gas lens consists of a base body having a gas distribution channel with at least one gas-lens filter, with an above-described insertion element being arranged in the gas-distribution channel, and with a gas-lens filter, seen in the out-flow direction of the gas, being arranged downstream of the insertion element.

4 Claims, 7 Drawing Sheets

(56) References Cited

U.S. PATENT DOCUMENTS

| | | | |
|---|---|---|---|
| 3,495,066 A * | 2/1970 | Guetet et al. | 219/74 |
| 5,094,152 A * | 3/1992 | Muller | 454/296 |
| 5,620,616 A * | 4/1997 | Anderson et al. | 219/121.52 |
| 5,772,102 A * | 6/1998 | New et al. | 228/42 |
| 5,893,985 A | 4/1999 | Luo et al. | |
| 6,037,557 A * | 3/2000 | Sperling | 219/75 |
| 6,123,506 A * | 9/2000 | Brand et al. | 415/208.3 |
| 6,182,912 B1 * | 2/2001 | Muller et al. | 239/585.1 |
| 6,207,921 B1 * | 3/2001 | Hanna | 219/74 |
| 6,525,288 B2 * | 2/2003 | Rehrig | 219/74 |
| 6,683,279 B1 * | 1/2004 | Moerke | 219/137.2 |
| 2002/0134760 A1 | 9/2002 | Rehrig et al. | |
| 2007/0284340 A1 * | 12/2007 | Jorgensen | 219/121.5 |

FOREIGN PATENT DOCUMENTS

| | | |
|---|---|---|
| GB | 816632 | 7/1959 |
| JP | 2001-150142 | 6/2001 |
| RU | 1 515 546 | 7/1994 |

* cited by examiner

INSERTION ELEMENT, GAS LENS WITH SUCH AN INSERTION ELEMENT, AND WELDING TORCH WITH SUCH A GAS LENS

CROSS REFERENCE TO RELATED APPLICATIONS

This application is the National Stage of PCT/AT2007/000400 filed on Aug. 22, 2007, which claims priority under 35 U.S.C. §119 of Austrian Application No. A 1702/2006 filed on Oct. 12, 2006. The international application under PCT article 21(2) was not published in English.

BACKGROUND OF THE INVENTION

1. Field of the Invention

The invention relates to an insertion element for a gas lens of a WIG/TIG welding torch, to a gas lens for a WIG/TIG welding torch, and to a WIG/TIG welding torch.

2. Description of the Related Art

WIG/TIG welding torches are known from the prior art, wherein a gas lens is inserted into the torch body in whose gas-distribution space several gas-lens filters are provided. The gas-lens filters are always arranged to be spaced apart so as to allow for the gas to spread correspondingly within the cavity between the base body of the gas lens and the gas-lens filter, and between the gas-lens filters.

Here, it is disadvantageous that a correspondingly large cavity has to be provided between the gas-lens filters so as to allow for a good gas distribution, which is why the size of the gas lens has to be correspondingly large. Furthermore, in the prior art it is necessary to use several gas-lens filter to generate an appropriate backflow. In case of only one gas-lens filter, it might happen that the gas flowing into the cavity does not spread evenly across the cross-section before reaching the gas-lens filter, thus flowing through the gas-lens filter into the downstream gas nozzle in an uneven manner. This can be avoided by using several gas-lens filters since a corresponding backflow is generated within each cavity upstream of the gas-lens filters which is why the gas will be distributed. The more gas-lens filters are used the better the gas distribution across the cross-section.

SUMMARY OF THE INVENTION

The object of the invention resides in creating an above-mentioned insertion element for a gas lens of a WIG/TIG welding torch, a gas lens for a WIG/TIG welding torch, and a WIG/TIG welding torch, allowing for a better gas distribution to be achieved across the cross-section of the gas lens, and thus also across the cross-section of the gas nozzle. The size, and the weight, of the components shall be as small and as low as possible.

The object of the invention is achieved by an above-mentioned insertion element, with fan-shaped flow elements being arranged around the bore and twisted relative to the plane of the bore so as to provide for radial deviation of a gas flowing therethrough. Here, it is advantageous that the gas flowing in linearly will be deviated across the fan-shaped flow elements if the insertion element is used in a gas lens. This causes rotation of the gas, and allows for a better distribution of the gas. When using a such-designed insertion element, the cavity downstream thereof can be very small to provide for an optimum gas distribution since the prompted rotation of the gas enables faster and quicker spreading of the gas across the cavity, thanks to which the gas can flow through the entire gas-lens filter in an even manner.

Furthermore, the object of the invention is achieved by an above-mentioned gas lens, with an above-mentioned insertion element being arranged in the gas-distribution channel of the base body, and with a gas-lens filter being arranged downstream of the insertion element, seen in the outflow direction of the gas. Here, it is advantageous that the use of only one insertion element and one gas-lens filter allows for the size of the gas lens to be reduced. The special design of the insertion element enables that the cavities for gas distribution necessary upstream, and downstream, thereof are as small as possible, thus in turn reducing the total size of the gas lens, and rendering possible an optimum gas distribution across the cross-section of the gas lens.

Thanks to such a reduction in size of the gas lens to a length of from 20 mm to 30 mm, e.g., the size and the weight of the welding torch, and thus also of its torch body, is decreased and handling of the welding torch is improved.

The object of the invention is also achieved by an above-mentioned WIG/TIG welding torch, with the gas lens being designed according to the invention, and with an insertion element according to the invention being arranged in the gas lens.

Further advantageous designs and the advantages resulting therefrom can be learned from the description below.

In the following, the invention will be explained in more detail by way of exemplary embodiments.

BRIEF DESCRIPTION OF THE DRAWINGS

Therein.

FIGS. 1 to 10 show a WIG/TIG welding torch 1. The welding torch 1 comprises a welding body 2 and a torch handle 3 (illustrated in dotted lines). Here, the structure of the individual components of the welding torch 1 corresponds to the structure proposed by the prior art which is why these components, and their function, will not be addressed in more detail.

Figures 1, 2:
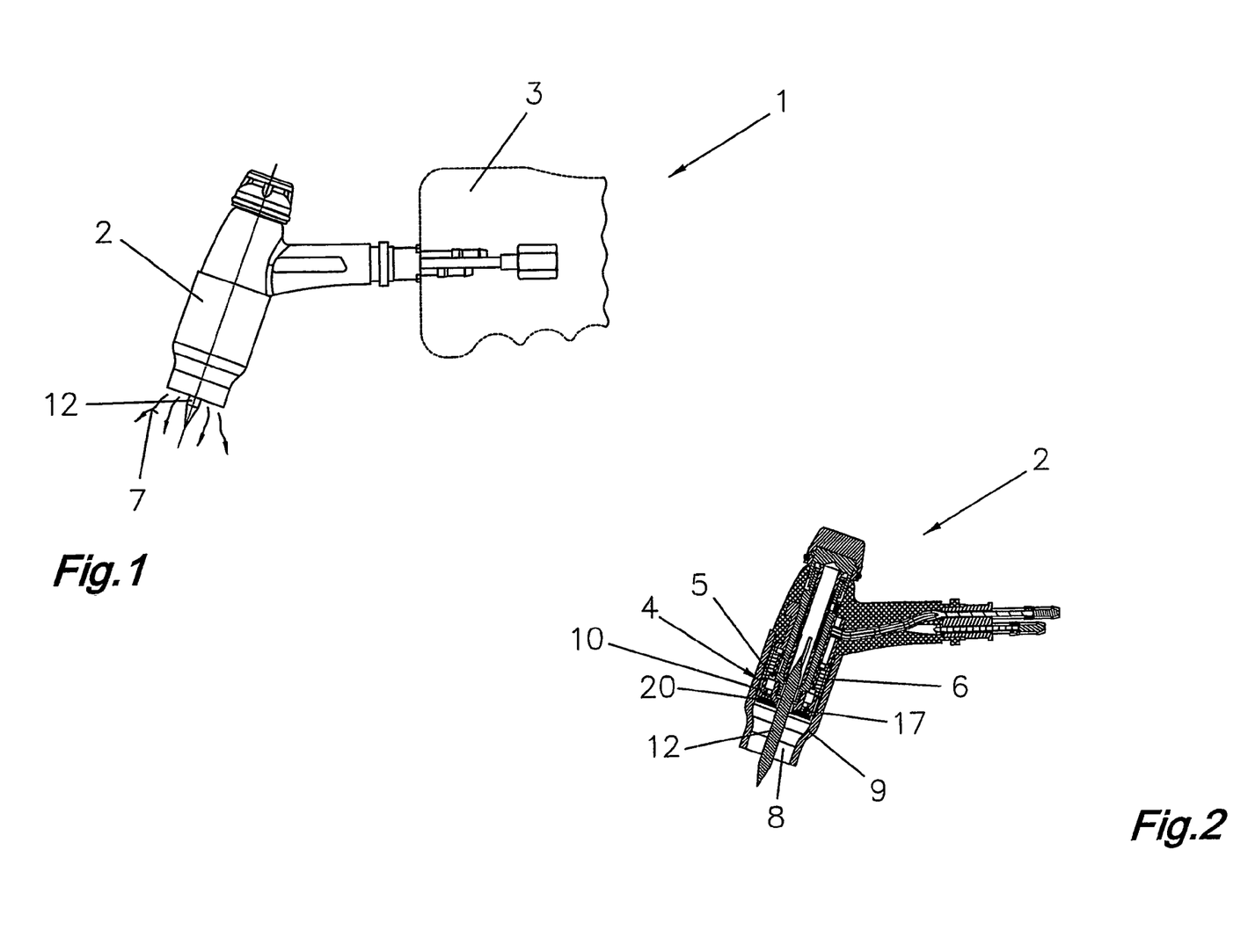
FIG. 1 shows a schematic representation of a welding torch.
FIG. 2 shows a schematic, sectional representation of the torch body.
Figure 3:
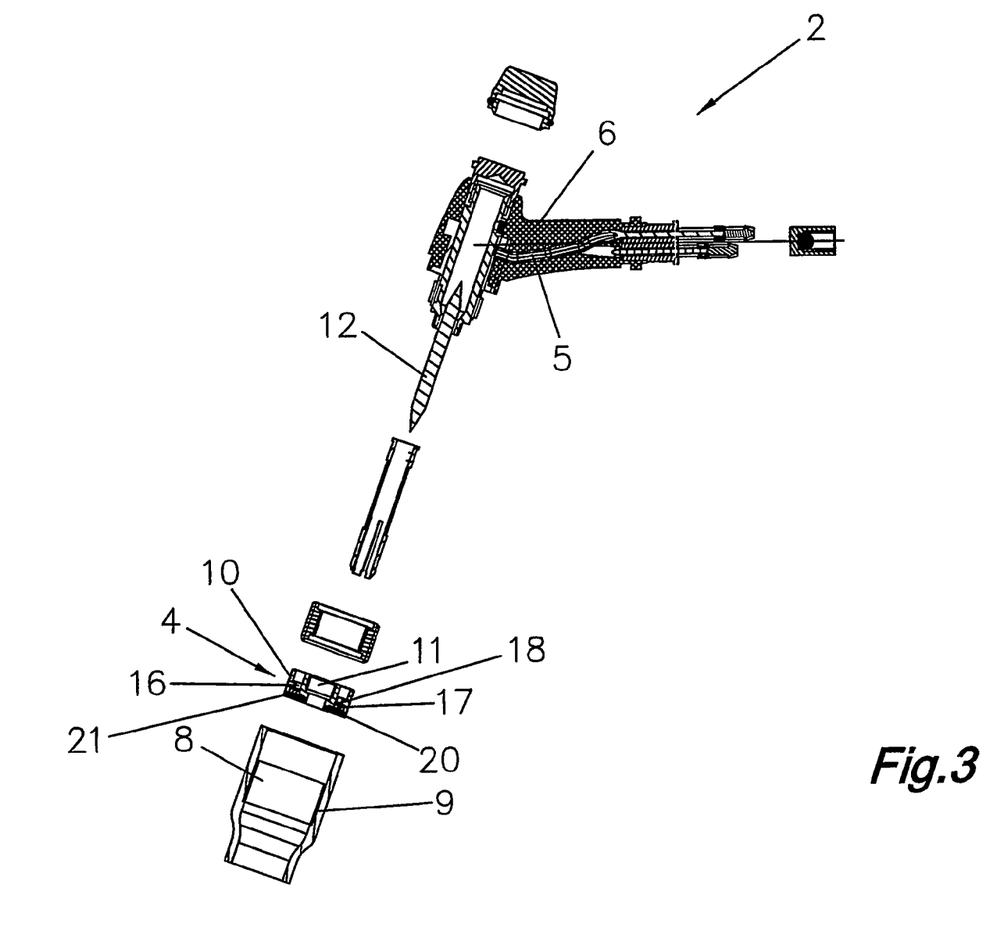
FIG. 3 shows an exploded view of the individual elements of the welding torch.

The invention is a detailed solution for a gas lens 4 which is provided in the torch body 2 and used for distributing the gas 7 fed via the gas-supply channels 5 in the base element 6. The gas 7 fed via the base element 6 flow from the same into the gas lens 4, and will then be distributed across the cross-section of the gas lens 4. This allows for an optimum gas distribution to be achieved within a gas nozzle 9 when the gas 7 flows out of the gas lens 4, and thus when the gas 7 enters an interior 8 of the gas nozzle 9. What is essential here is that the size of the gas lens 4 is as small as possible since this allows for the total size of the welding torch 1 to be reduced, and for the handling of the same to be considerably improved.

DETAILED DESCRIPTION OF PREFERRED EMBODIMENTS

Figures 4, 5, 6:
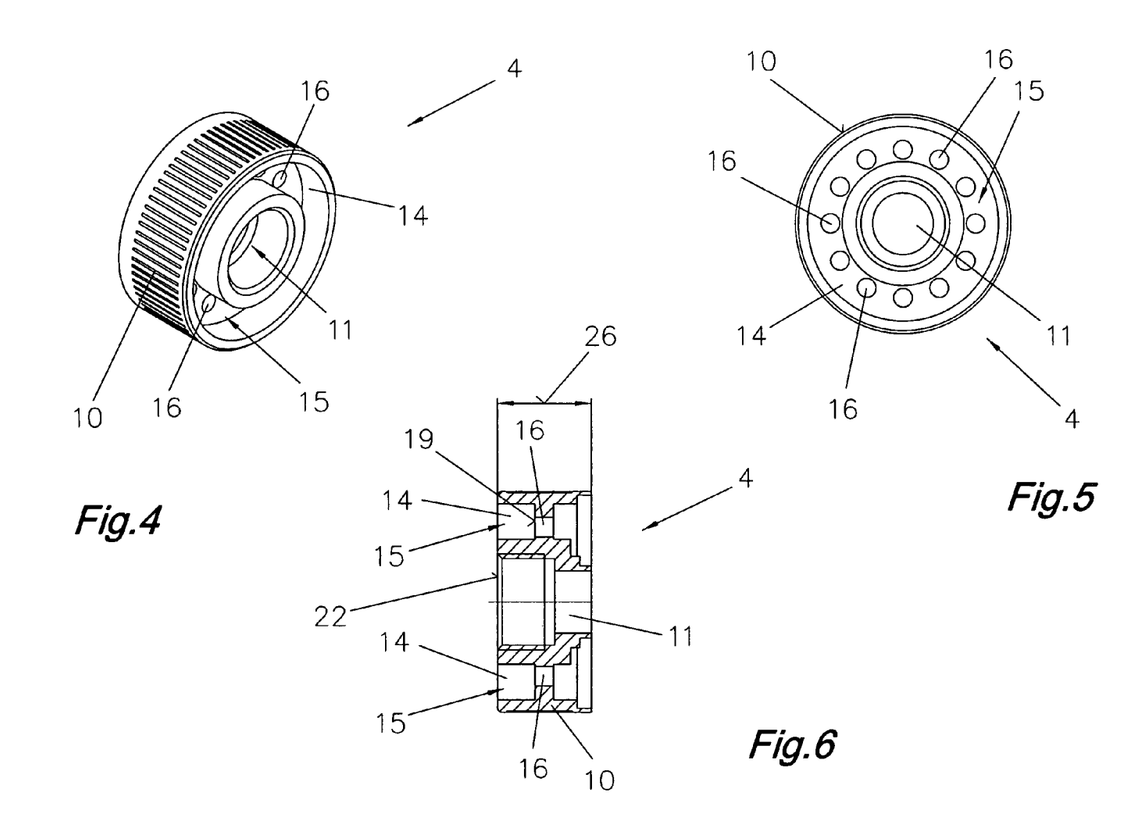
FIG. 4 shows an oblique drawing of a gas lens for the torch body.
FIG. 5 shows a top view of the gas lens.
FIG. 6 shows a section through the gas lens of FIG. 4.

The gas lens 4 consists of a base body 10 preferably made of copper or a copper alloy. In the center of the gas lens 4, a continuous opening 11 is provided through which an electrode 12, and optionally an electric-arc nozzle 13, can be guided. Furthermore, the base body 10 has a recess 14 for forming the gas-distribution space 15. Within the base body 10, at the front sides thereof, bores 16 are provided which lead into the gas-distribution space 15. The gas 7 may flow from the base element 6 into the gas-distribution space 15 via the bores 16 and via the gas-supply channels 5.

Figure 7:
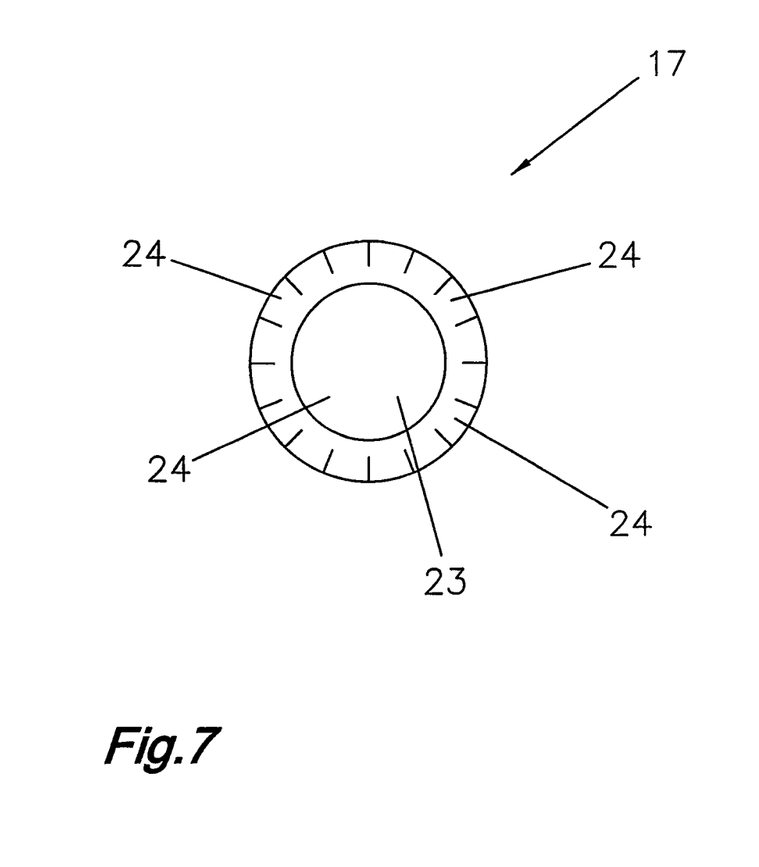
FIG. 7 shows a top view of an insertion element for the gas lens.
Figure 8:
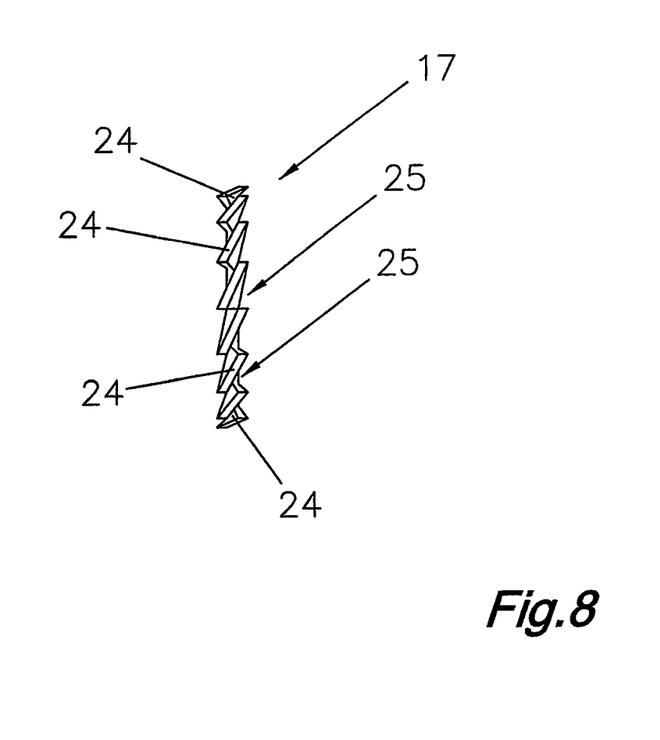
FIG. 8 shows a side view of the insertion element of FIG. 7, in simplified representation.
Figure 9:
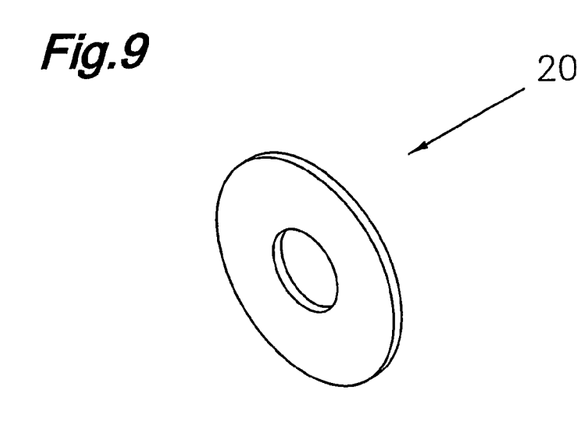
FIG. 9 shows an oblique drawing of a filter for the gas lens.
Figure 10:
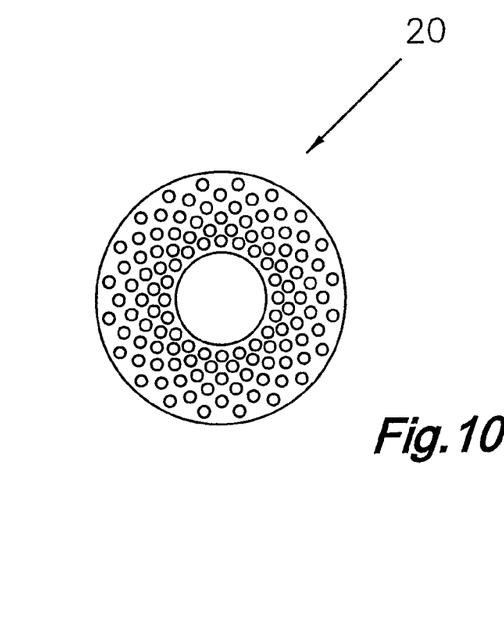
FIG. 10 shows a top view of the gas-lens filter of FIG. 9, in simplified representation.

To achieve an optimum gas distribution across the entire cross-section of the gas-distribution space 15, an insertion element 17 is arranged in the gas-distribution space 15, and illustrated in detail in FIGS. 7 and 8. The insertion element 17 is arranged in the gas-distribution space 15 so as to form a small cavity 18 between the discharge region of the bores 16 and the insertion element 17. Here, the insertion element 17 may have appropriate projections which provide an appropriate distance from the front face 19 of the gas-distribution space 15. Likewise, it is possible to arrange a web in the recess 14 and/or the gas-distribution space 15, onto which web an insertion element 17, produced in a simple manner, is put.

Thereafter, a prior-art gas-lens filter 20 (FIGS. 9 and 10) is inserted into the gas-distribution space 15 at a small distance from the insertion element 17. Here, projections may also be arranged on the gas-lens filter 20 so as to form a cavity 21 between the gas-lens filter 20 and the insertion element 17, with said projections forming an appropriate distance from the insertion element 17, or webs may be positioned on the base body 10, with the gas-lens filter 20 being provided on said webs. The gas-lens filter 20 is preferably positioned to be aligned with the front face 22 of the base body 10 of the gas lens 4. The gas-lens filter 20 consists of a number of small holes through which the gas 7 can flow into the gas nozzle 9. Here, a certain gas backflow will be achieved within the cavity 21 between the gas-lens filter 20 and the insertion element 17. This gas backflow is necessary to allow for the gas 7 to spread fully within the cavity 21, and to thereafter flow through the entire gas-lens filter 20 into the gas nozzle 9.

To achieve an optimum distribution of the gas 7 within the cavity 21, the insertion element 17 is of an appropriate design, with a bore 23 in the center through which the electrode 12 is to be guided, said bore 23 being configured in correspondence with the opening 11 in the base body 10 of the gas lens 4. As can be seen from FIGS. 7 and 8, the insertion element 17 includes fan-shaped flow elements 24 which are twisted relative to the plane of the bore 23 so as to provide for radial deviation of the gas 7 flowing therethrough. Channels 25 are formed between the individual flow elements 24 so that the gas 7 fed via the bore 16 into the cavity 18 between the insertion element 17 and the front face of the base body 10 must flow through these obliquely extending channels 25 of the insertion element 17 into the other cavity 21 between the insertion element 17 and the gas-lens filter 20.

These obliquely extending channels 25 put the gas 7 flowing therethrough into rotation so that the gas 7 will still rotate in the other cavity 21 between the insertion element 17 and the gas-lens filter 20. This gas rotation allows for a substantially better gas distribution within the cavity 21. Putting the gas 7 into rotation enables the size of the cavity 21 to be very small. For example, the distance between the insertion element 17 and the gas-lens filter 20 may be merely from 1 mm to 3 mm. This contributes considerably to the total size of the gas lens 4, and thus to the size of the torch body 2.

In known prior-art solutions, most of the gas lenses 4 are provided with several of such gas-lens filters 20 between which one cavity 18 or 21 each has to be formed. Since always only one linear gas flow through the gas-lens filters 20 is present with prior-art solutions, the cavities 18 or 21 must be considerably larger to allow for a good gas distribution, an improved gas backflow within the cavities 18 and 21, and thus for an improved gas distribution across the cross-section. Consequently, prior-art solutions require a gas lens 4 which is substantially longer than the inventive gas lens 4.

With the inventive gas lens 4, the length 26 can be reduced by 50%, compared to presently used gas lenses. For example, the length 26 of the gas lens 4 may range between 20 mm and 30 mm in case of optimum gas distribution through the insertion element 17. This small size allows for the entire torch body 2 to be smaller, and lighter, thus improving handling of the welding torch 1.

Figures 11, 12, 13:
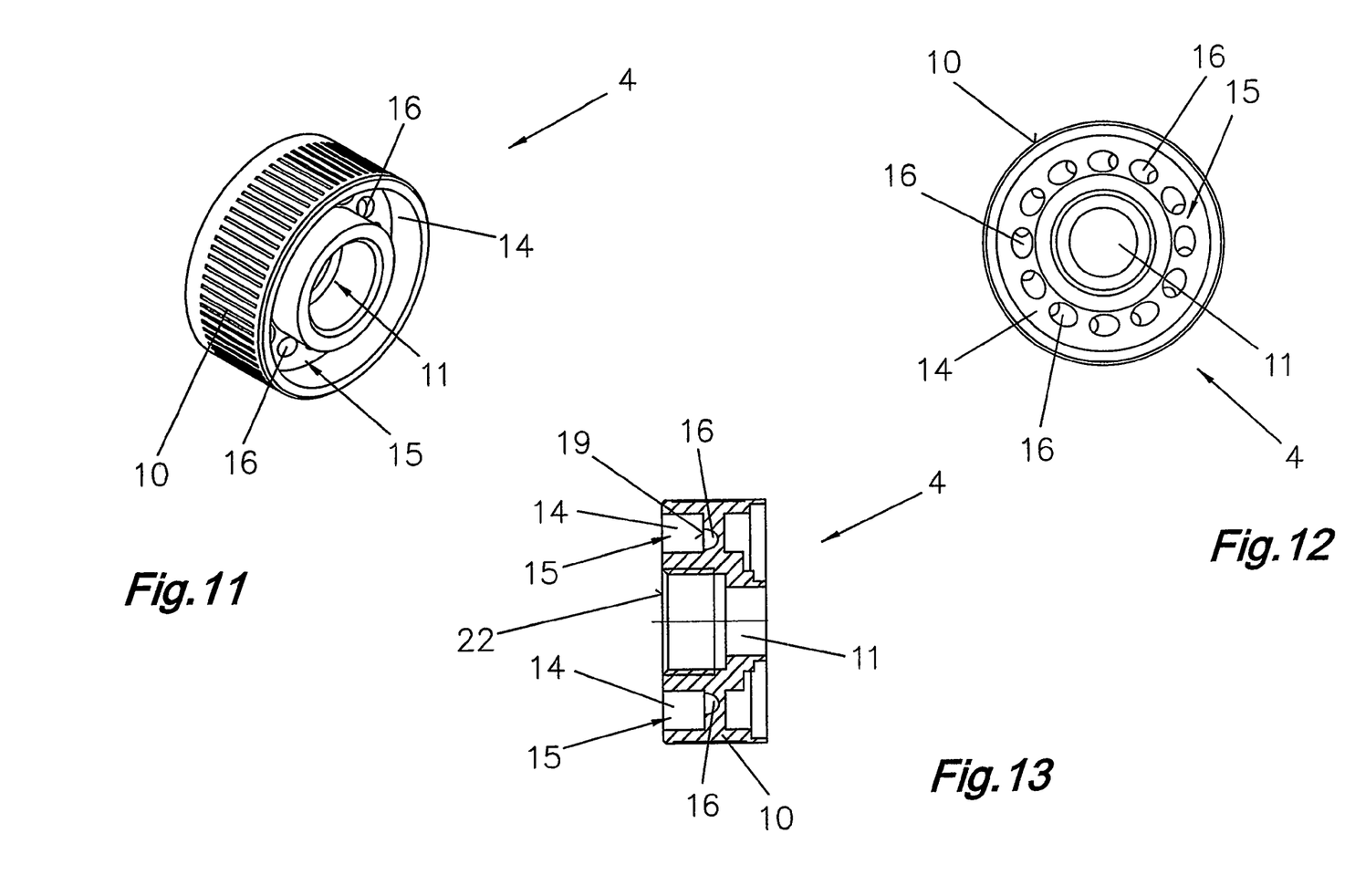
FIG. 11 shows an oblique drawing of an embodiment variant of the gas lens.
FIG. 12 shows a top view of the gas lens of FIG. 11.
FIG. 13 shows a section through the gas lens of FIG. 11.
Figure 14:
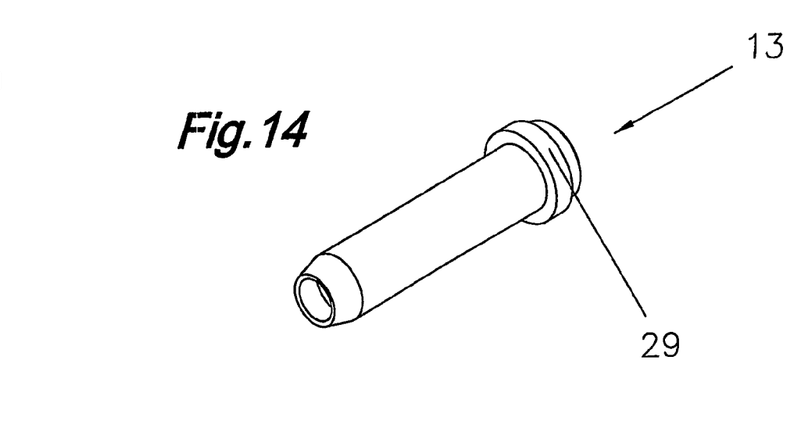
FIG. 14 shows an oblique drawing of an electric-arc nozzle.
Figure 15:
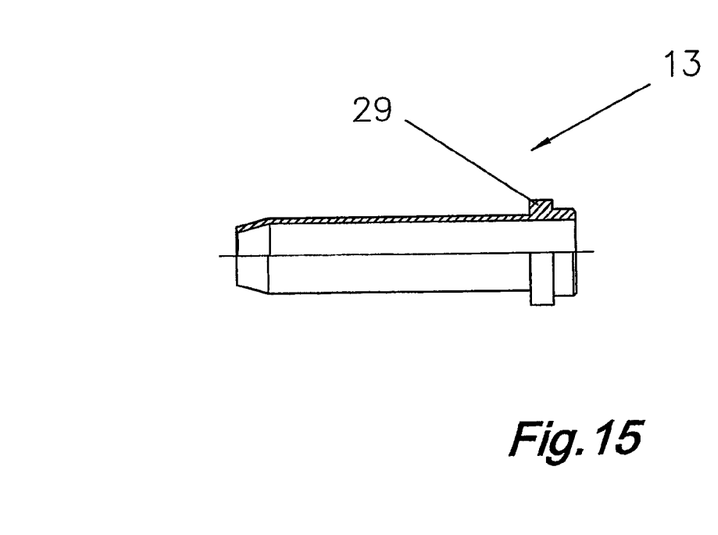
FIG. 15 shows a partially sectioned representation of the electric-arc nozzle of FIG. 14.
Figure 16:
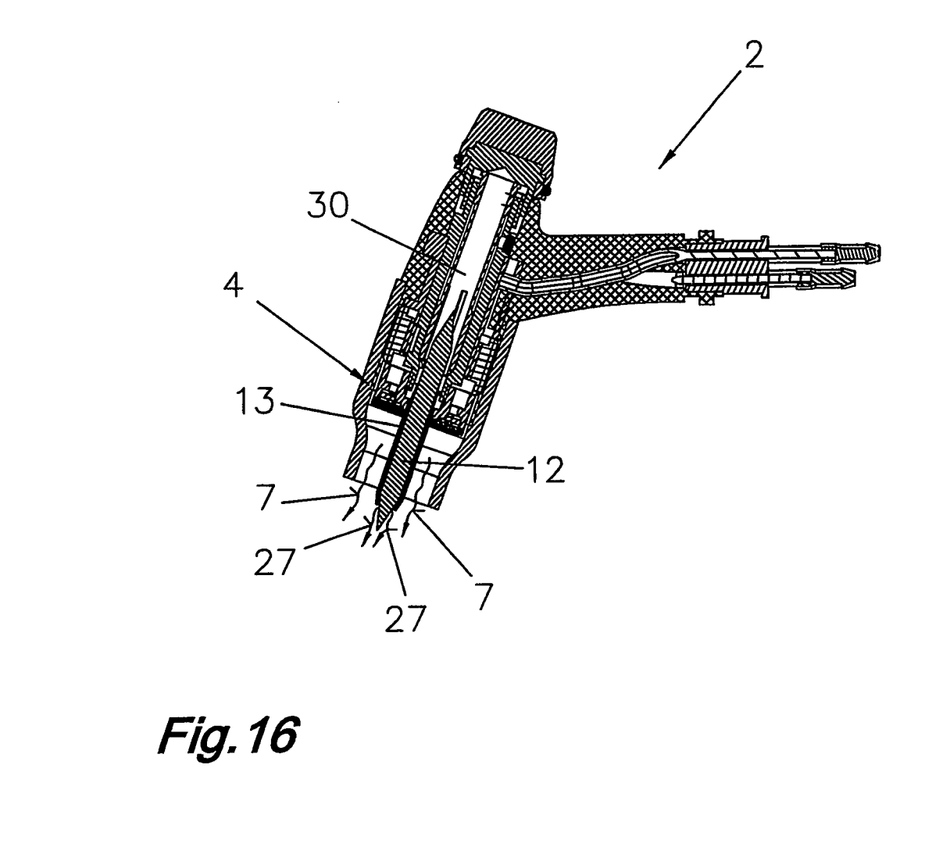
FIG. 16 shows a section through the welding torch which includes the electric-arc nozzle of FIG. 14, in simplified representation.
Figure 17:
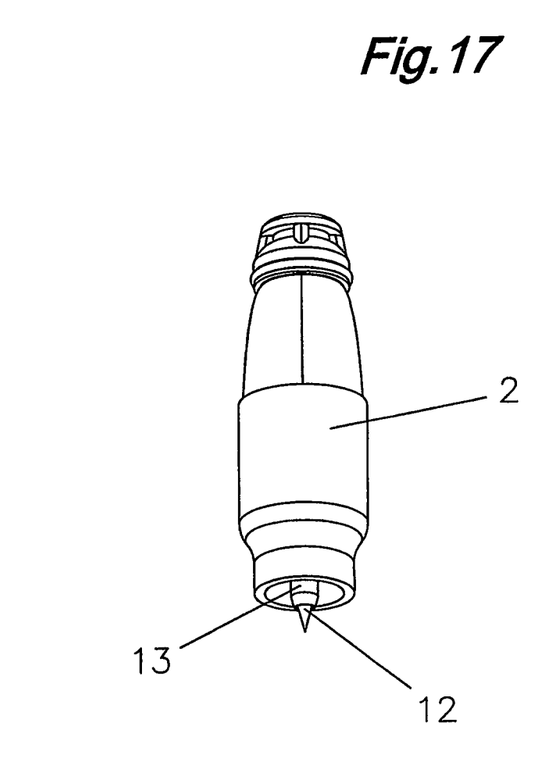
FIG. 17 shows a schematic representation of the welding torch with the electric-arc nozzle.

A further exemplary embodiment of the gas lens 4 is shown in FIGS. 11 to 13. The difference to the above-described gas lens 4 is that the insertion element 17 has been omitted. To again achieve rotation of the gas 7 before it flows out of the gas-lens filter 20, the bores 16 are now provided in the base body 10 of the gas lens 4 in a manner angular to the longitudinal center axis of the gas nozzle 9, and not linear, as is usually the case, the gas 7 fed from the gas-supply channel 5 thus flowing obliquely into the cavity 18 between a front face of the base body 10 and the gas-lens filter 20. The gas backflow within the cavity 18 prompts the obliquely flowing gas 7 to rotate within the cavity 18, thus achieving an optimum gas distribution across the entire cross-section in as small a cavity 18 as possible.

FIGS. 14 to 17 show an electric-arc nozzle 13 in detail which can be used for the welding torch 1 in case of two different gases 7 and 27.

The electric-arc nozzle 13 is tubular, with the interior diameter being larger than the diameter of the electrode 12 to be guided through the electric-arc nozzle 13. At one end, the electric-arc nozzle 13 preferably has a stop web 29 via which the electric-arc nozzle 13 can be positioned in the gas lens 4. The object of the electric-arc nozzle 13 is to guide a first gas 17, fed across the center 30 of the torch body 2, as close to the welding site as possible, in a manner that the first gas 27 does not mix with the other gas 7 fed from the gas lens 4 via the gas nozzle 9 to the welding site. The electric-arc nozzle 13 is preferably used when a welding process is to be conducted with two different gases 7 and 27, the first gas 27 serving for stabilizing the electric arc, and the second gas 7 provided around the first, so-called gas bell serving for protecting the welding process from exterior outer influences.

This system including an electric-arc nozzle 13 allows for the welding torch 1 to be easily retrofit to a torch to be used with two gases. Inserting such an electric-arc nozzle 13 enables an additional gas 27 to be fed to the welding process via the electrode 12 and/or an electrode-guiding channel, said gas being fed via the electric-arc nozzle 13 as close to the welding process as possible before coming into contact with the other gas 7 fed via the gas lens 4 and the gas nozzle 9. Thus, contact of the first gas 27 with the second gas 7 can be adjusted, depending on the length of the electric-arc nozzle 13 used.

It goes without saying that also only one gas 7 or 27 may be used, and that a correspondingly more dense gas bell can be produced by using the electric-arc nozzle 13 in the center around the electrode 12.

The invention claimed is:

1. A gas lens for a WIG/TIG welding torch with a gas nozzle, the gas lens having:
   a base body having:
     a continuous opening in the center for an electrode,
     bores for feeding a gas, and
     a gas-distribution channel for distributing the gas,
   at least one gas-lens filter in the gas-distribution channel,
   an insertion element positioned within the gas-distribution channel and having a center, a bore in the center, and pleated fan-shaped flow elements arranged around the bore to form channels between the individual pleated fan-shaped flow elements, a non-consumable electrode being able to be guided through the bore of the insertion element, the pleated fan-shaped flow elements being twisted relative to a plane of the bore of the insertion element so as to provide for radial deviation and rotation of a gas flowing through the channels between the individual pleated fan-shaped flow elements, wherein each pleated fan-shaped flow element extends from a radial outward edge of the insertion element and is defined by at least one respective radial incision extending from the radial outward edge of the insertion element, the at least one respective radial incision defining a respective flow path for the gas,
   wherein the at least one gas-lens filter is arranged downstream of the insertion element, seen in an outflow direction of the gas to form a cavity between the at least one gas-lens filter and the insertion element, and
   wherein the pleated fan-shaped flow elements cause the gas leaving the insertion element to rotate in the cavity between the insertion element and the at least one gas-lens filter.

2. The gas lens according to claim 1, wherein the base body has a length of from 20 mm to 30 mm.

3. A WIG/TIG welding torch comprising a torch handle, a torch body, a gas nozzle, and a gas lens, the gas lens having:
   a base body having:
     a continuous opening in the center for an electrode,
     bores for feeding a gas, and
     a gas-distribution channel for distributing the gas,
   at least one gas-lens filter in the gas-distribution channel,
   an insertion element positioned within the gas-distribution channel and having a center, a bore in the center, and pleated fan-shaped flow elements arranged around the bore to form channels between the individual pleated fan-shaped flow elements, a non-consumable electrode being able to be guided through the bore of the insertion element, the pleated fan-shaped flow elements being twisted relative to a plane of the bore of the insertion element so as to provide for radial deviation and rotation of a gas flowing through the channels between the individual pleated fan-shaped flow elements, wherein each pleated fan-shaped flow element extends from a radial outward edge of the insertion element and is defined by at least one respective radial incision extending from the radial outward edge of the insertion element, the at least one respective radial incision defining a respective flow path for the gas,
   wherein the at least one gas-lens filter is arranged downstream of the insertion element, seen in an outflow direction of the gas to form a cavity between the at least one gas-lens filter and the insertion element, and
   wherein the pleated fan-shaped flow elements cause the gas leaving the insertion element to rotate in the cavity between the insertion element and the at least one gas-lens filter.

4. The WIG/TIG welding torch according to claim 3, wherein an electric-arc nozzle is insertable into the torch body, in particular into the gas lens, for guiding two gases so as to form a double-gas welding torch.

* * * * *